US006978450B2

(12) United States Patent
Burch

(10) Patent No.: US 6,978,450 B2
(45) Date of Patent: *Dec. 20, 2005

(54) METHOD AND SYSTEM FOR OPTIMIZING COMPILATION TIME OF A PROGRAM BY SELECTIVELY REUSING OBJECT CODE

(75) Inventor: Carl D. Burch, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 647 days.

This patent is subject to a terminal disclaimer.

(21) Appl. No.: 10/017,572

(22) Filed: Oct. 23, 2001

(65) Prior Publication Data

US 2002/0046400 A1   Apr. 18, 2002

Related U.S. Application Data

(63) Continuation-in-part of application No. 09/232,398, filed on Jan. 15, 1999, now Pat. No. 6,308,320.

(51) Int. Cl.[7] ............................ G06F 9/45; G06F 9/44; G06F 17/00
(52) U.S. Cl. .................. 717/145; 717/121; 717/146; 717/162; 715/511
(58) Field of Search ......................... 717/120, 151, 717/152, 162, 146; 715/511

(56) References Cited

U.S. PATENT DOCUMENTS

| 5,204,960 | A |   | 4/1993  | Smith et al.        |         |
|-----------|---|---|---------|---------------------|---------|
| 5,230,050 | A |   | 7/1993  | Iitsuka et al.      |         |
| 5,301,327 | A |   | 4/1994  | McKeeman et al.     |         |
| 5,313,387 | A |   | 5/1994  | McKeeman et al.     |         |
| 5,325,531 | A |   | 6/1994  | McKeeman et al.     |         |
| 5,375,242 | A |   | 12/1994 | Kumar et al.        |         |
| 5,586,328 | A |   | 12/1996 | Caron et al.        |         |
| 5,655,122 | A |   | 8/1997  | Wu                  |         |
| 5,680,622 | A | * | 10/1997 | Even .............. | 717/154 |
| 5,740,439 | A | * | 4/1998  | Atkinson et al. ... | 719/320 |
| 5,805,899 | A | * | 9/1998  | Evans et al. ....... | 717/170 |
| 5,815,720 | A |   | 9/1998  | Buzbee              |         |
| 5,850,554 | A |   | 12/1998 | Carver              |         |
| 5,854,932 | A | * | 12/1998 | Mariani et al. .... | 717/116 |
| 6,035,124 | A | * | 3/2000  | Ng .................| 717/146 |
| 6,308,320 | B1|   | 10/2001 | Burch               |         |

(Continued)

OTHER PUBLICATIONS

"PA Risk Compiler Optimization White Paper." Copyright Hewlett-Packard Co. 1992 (#5091-5594E). Visited Jan. 14, 1998. <http://cllweb.cup.hp.com/llo>.

(Continued)

*Primary Examiner*—Tuan Dam
*Assistant Examiner*—J. Derek Rutten

(57) ABSTRACT

The present invention provides a system and method for optimizing compilation time of a program. In architecture, the system includes a compiler that generates the least one block of code from the program; and a compilation optimizer. The compilation optimizer generates a hash value for a block of code in the program and stores the hash value with the block of code if the hash value is not equal to a prior hash value for the block of code; and skips the optimization of the block of code if the hash value equals the prior hash value. The present invention can also be viewed as a method for optimizing compilation time of a program. The method operates by generating a current hash value for a block of code in the program, skipping the optimization of the block of code if the current hash value equals a prior hash value, and storing the current hash value with the block of code if the hash value is not equal to the prior hash value for the block of code.

27 Claims, 6 Drawing Sheets

U.S. PATENT DOCUMENTS 6,308,323 B1 * 10/2001 Douniwa ............... 717/154
6,802,056 B1 * 10/2004 Chaiken et al. ............. 717/136

OTHER PUBLICATIONS

"Pa-RISC Optimizer Trouble-Shootinf Guide." Carl Burch, Copyright Hewlett-Packard Co. 1996, version 2.1.
"Compiler Optimizations For The PA-8000." Anne M. Holler, Hewlett-Packard Company.
Fowler et al. Principles for Writing Reusable Libraries. ACM. Pp. 150-159. 1995.
"Profile-Based Optimization," (HP-UX Linker And Libraries User's Guide, visited Nov. 18, 1998) <http://info.fc.hp.com:80/dynaweb/hGeneric_BookTextView/25764; uf=0#X>.
"When To Use PBO," (HP-UX Linker And Libraries User's Guide, visited Nov. 20, 1998) <http://info.fc.hp.com:80/dynaweb/huen 1 a/@Generic_BookTextView/25845>.
"Using PBO With Id-r," (HP-UX Linker And Libraries User's Guide, visited Nov. 20, 1998) <http://info.fc.hp.com:80/dynaweb/huen 1 a/@Generic_BookTextView/27667>.
"Selecting An Optimization Level With PBO," (HP-UX Linker And Libraries User's Guide, visited Nov. 20, 1998) <http://info.fc.hp.com:80/dynaweb/huen 1 a/@Generic_BookTextView/27412>.
"Storing Profile Information For Multiple programs," (HP-UX Linker And Libraries User's Guide visited Nov. 20, 1998) <http://info.fc.hp.com:80/dynaweb/hGeneric_BookTextView/26652;uf= 0#X>.
"Forking An Instrumental Application," (HP-UX Linker And Libraries User's Guide, visited Nov. 20, 1998) <http://info.fc.hp.com:80/dynaweb/hGeneric_BookTextView/26892;uf= 0#X>.
"Using PBO To Optimize Shared Libraries," (HP-UX Linker And Libraries User's Guide, visited Nov. 20, 1998) <http://info.fc.hp.com:80/dynaweb/huen 1 a/@Generic_BookTextView/27544>.
"Optimizing Based On Profile Data (+ P/·P)," (HP-UX Linker And Libraries User's Guide, visited Nov. 20, 1998) <http://info.fc.hp.com:80/dynaweb/huen 1 a/@Generic_BookTextView/26943>.
"Linker Optimizations," (HP-UX Linker And Libraries User's Guide, visited Dec. 4, 1998) <http://info.fc.hp.com:80/dynaweb/hBookTextView /25332?DwebQuery= isom>.
"Using The Compiler To Link," (HP-UX Linker And Libraries User's Guide, visited Dec. 4, 1998) <http://info.fc.hp.com:80/dynaweb/h . . . _ BookTextView / 3313?DwebQuery= isom>.
"Instrumenting (=I/·I)," (HP-UX Linker And Libraries User's Guide, visited Dec. 4, 1998) <http://info.fc.hp.com:80/dynaweb/h . . . /26095;nh= 1;uf= 0?DwebQuery= isom#X>.
"Choosing Input Data," (HP-UX Linker And Libraries User's Guide, visited Dec. 20, 1998) <http://info.fc.hp.com:80/dynaweb/h . . . Generic_BookTextView/26517;uf= 0#X>.
"Sharing The Flow.data File Among Multiple Processes," (HP-UX Linker And Libraries User's Guide, visited Dec. 20, 1998) <http://info.fc.hp.com:80/dynaweb/h . . . Generic_BookTextView/26773;uf=O#X>.
"Improving Shared Library Start-Up Time With Fastbind," (HP-UX Linker And Libraries User's Guide, visited Nov. 18, 1998) <http://info.fc.hp.com:80/dynaweb/h . . . uen 1 a/@Generic_BookTextView/28512>.
"What Happens When You Compile And Link A Program," (HP-UX Linker And Libraries User's Guide, visited Dec. 08, 1998 <http://docs.hp.com:80/dynaweb/hpux11/dtdc . . . ric_BookTextView/1598? DwebQuery= loader#1>.
"Looking Inside A Compiler," (HP-UX Linker And Libraries User's Guide, visited Dec. 08, 1998) <http://docs.hp.com:80/dynaweb/hpux11/dtdc . . . extView/1790;nh= 1;uf= O? DwebQuery= loader#X>.
"Position-Independent Code," (HP-UX Linker And Libraries User's Guide, visited Dec. 08, 1998) <http://docs.ho.com:80/dynaweb/hpux11/dtdc . . . ic_BookTextView/24622? DwebQuery= loader#1>.
"SmartBuild External Specification, Version 1.0," Carl Burch , Nathaniel Nystrom (Dec. 08, 1998). visited Jan. 13, 1999: <http://cllweb.cup.hp.com./llo/documents/general/smartbuild_es.html>.
"SmartBuild High-Level Design, Version 1.0," Carl Burch, Nathaniel Nystrom (Sep. 28, 1998). visited Jan. 13, 1999: <http://cllweb.cup.hp.com./llo/docuemnts/general/smartbuild_hld.html>.
"SmartBuild Low Level Design, Version 1.0." Nathaniel Nystrom (Oct. 22, 1998). Visited Jan. 13, 1999: <http://cllweb.cup.hp.com./llo/documents/general/smartbuild_lld.html>.
"Performace Tuning With Pa-RISC Compilers," Visited Jan. 13, 199. <http://cllweb.cup.hp.com./llo/documents/general/smartbuild_lld.html>.
"Boolean Operator," Visited Dec. 8, 1998. <http://weborpedia.internet.com/Programming/Operators/Boolean_operator.html>.
Secure Hash Standard (U.S. Dept. of Commerce/National Institute of Standards and Technology, FIPS PUB 180· 1. Apr. 17, 1995.
"The MD5 Message-Digest Algorithm," Ronald L. Revist, Network Working Group, MIT Labratory For Computer Science and RSA Data Security, Inc. Apr. 1992 (RFC 1321).
"What Is An Object File?" (HP-UX Linker And Libraries User's Guide, visited Dec. 1, 1998) <http://info.fc.hp.com:80/dynaweb/h . . . h= 1;uf= O?DwebQuery= Instrumentings#X>.
Linking Programs On (HP-UX Linker And Libraries User's Guide, visited Dec. 1, 1998) <http://info.fc.hp.com:80/dynaw eb/h . . . /2170;nh= 1?Dw ebQuery= Instrumenting>.
"Linking With Libraries," (HP-UX Linker And Libraries User's Guide, visited Dec. 1, 1998) <http://info.fc.hp.com:80/dynaw eb/h . . ./2682;nh= 1?Dw ebQuery=Instrumenting>.

* cited by examiner

METHOD AND SYSTEM FOR OPTIMIZING COMPILATION TIME OF A PROGRAM BY SELECTIVELY REUSING OBJECT CODE

CROSS REFERENCE TO RELATED APPLICATION

This application is a continuation-in-part of application Ser. No. 09/232,398, filed Jan. 15, 1999, now U.S. Pat. No. 6,308,320 issued Oct. 23, 2001 entitled "METHOD AND APPARATUS FOR INCREMENTAL SELECTIVE COMPILATION OF INTERMEDIATE CODE FILES DURING COMPUTER SYSTEM COMPILATION AND LINKING," which is incorporated herein by reference.

FIELD OF THE INVENTION

The present invention relates generally to a method and system for compilers in computer systems. More particularly, the present invention relates to an incremental selective compiler tool that optimizes compilation time of a program by selectively reusing object code.

BACKGROUND OF THE INVENTION

Computer systems typically employ a compiler that may combine files located in different portions of the computer system, such as in the computer system memory. Compiling a source file creates an intermediate code stream, which is then translated to an object code file corresponding to compiler directives associated with the source code file. It will be appreciated that compiler directives may be instructions or data that affect the manner of compilation, thereby determining the result of the compilation. For instance, compiler directives may be used to manage the compilation of source code. Minimizing the amount of intermediate code optimized and compiled during the process of transforming intermediate code streams into object code reduces the computer system resources used by the compiler system. That is, the efficiency of a compiler may be improved by minimizing the amount of computer resources required to complete compilation of intermediate code streams into the resulting object code files for execution on the computer system.

Improvement in the efficiency of compiler systems has been hindered by the time and computer resources required compiling intermediate code streams into object code files. Therefore, there has been a need to selectively reuse parts of object code files when portions of the intermediate code stream that affect the resulting object code file, such as compiler directives, have not changed between invocations of the compiler. The problem with current incremental compilation systems is that most of the compilation time is wasted. The incremental compilation system wastes many builds due to overly conservative inputs to the recompilation decision. In particular, typical source file time stamp based systems cannot limit the scope of recompilation for any potentially large scoped changes such as header file edits. Thus, a heretofore unaddressed need exists in the industry to address the inefficiencies and inadequacies of existing compilation systems.

SUMMARY OF THE INVENTION

The present invention provides a system and method for optimizing compilation time of a program by selectively reusing object code. Briefly described, in architecture, the system can be implemented as follows. In architecture, the system includes a compiler that generates the at least one block of code from the program; and a compilation optimizer. The compilation optimizer generates a hash value for a block of code in the program and stores the hash value in the block of code if the hash value is not equal to a prior hash value for the block of code; and skips the optimization of the block of code if the hash value equals the prior hash value.

The present invention can also be viewed as providing a method for optimizing compilation time of a program. In this regard, the method can be broadly summarized by the following steps: (1) generating a current hash value for a block of code in the program; (2) skipping the optimization of the block of code if the current hash value equals a prior hash value; and (3) storing the current hash value in the block of code if the hash value is not equal to the prior hash value for the block of code.

Other features and advantages of the present invention will become apparent to one with skill in the art upon examination of the following drawings and detailed description. It is intended that all such additional features and advantages be included herein within the scope of the present invention.

DETAILED DESCRIPTION OF THE PREFERRED EMBODIMENT

Figure 1:
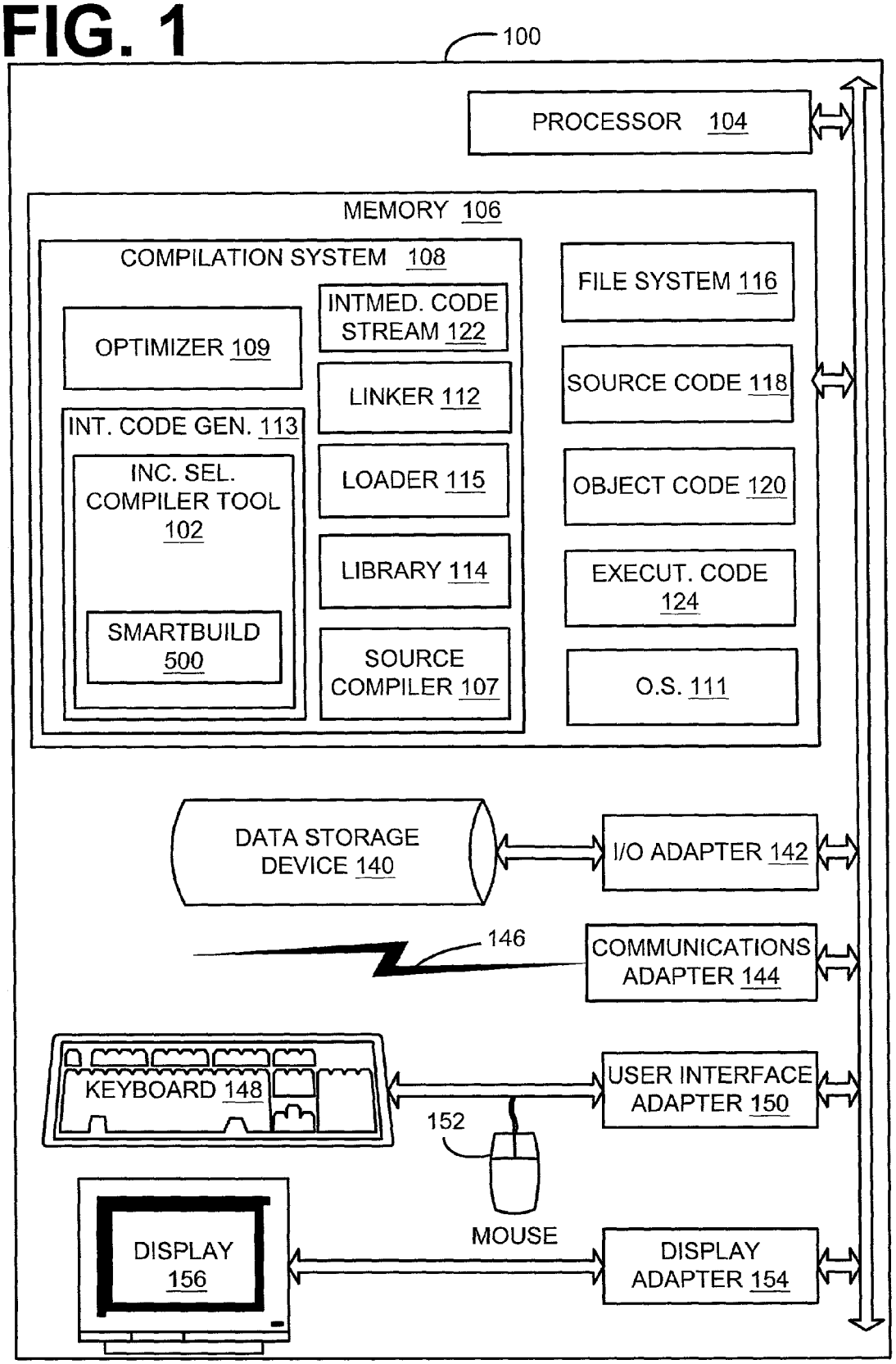
FIG. 1 is a block diagram that illustrates an example of the computer system including the incremental selective compiler tool of the present invention.

Referring now in more detail to the drawings, in which like numerals indicate corresponding parts throughout the several views, the present invention will be described. While the invention is described in connection with these drawings, there is no intent to limit it to the embodiment or embodiments disclosed therein. On the contrary, the intent is to cover all alternatives, modifications, and equivalents included within the spirit and scope of the invention as defined by the appended claims.

The present invention relates to a system and method for optimizing compilation time. Most compilations are generated into a very similar, if not identical, preexisting object file. Therefore, it is possible to reuse much or all of the preexisting object file object code as the result of the current compilation. To do this, a suitable annotation must be included with each object file to allow efficient identification of sections of code and data unchanged from a prior compilation. The compiler front-end emits intermediate code only for those constructs that are needed, isolating the effect of an input file change to those that could potentially change the resulting object code. It is then possible to ignore any change not reflected in the intermediate code generation. Compiler front ends typically build a symbol table for declarations, but include only those declarations referenced in the executable code into the intermediate code stream, thereby implicitly excluding a large fraction of the declarations read by the compiler front-end.

These annotations can be represented using digital signatures computed over the intermediate code for the function (or other scope) to detect changes with a very high degree of accuracy. In most compilers, practically all semantics of the emitted code are reflected in the intermediate code stream. When any small remaining state considered in code generation or optimization is then accounted for, the resulting digital signature computed over the intermediate code then reflects all of the factors that could alter the final output code. Thus, while the compiler front-end time is not saved, it serves to eliminate irrelevant changes that do not impact the intermediate code stream and hence the final code and data generated.

The present invention extends the use of incremental compilation systems as described in the commonly assigned and co-pending U.S. patent application entitled "Method and Apparatus for Incremental Selective Compilation of Intermediate Code Files During Computer System Compilation and Linking," Ser. No. 09/232,398, filed on Jan. 15, 1999, herein incorporated entirely by reference. This invention extends the technology of the commonly assigned and co-pending application to the mainstream of optimizing code builds that do not use intermediate code from files, but instead optimize the intermediate code emitted by the compiler front-end while compiling source code files.

The scope of recompilation decisions must match the scope of optimization decisions after the point in the pipeline where recompilation decisions are made (i.e., if the optimization scope matches the recompilation decision scope for all the necessary data that is contained in the digital signatures computed over the intermediate code stream for that scope.) If the optimization scope was wider than the recompilation scope, a change to one scope could change code generated outside the scope, which would then not be updated. On the other hand, computing the digital signature downstream of one optimization phase is not a problem if the recompilation or reuse decision is only accounted for in the actions of another optimization phase further down the compiler's pipeline.

Illustrated in FIG. 1 is a block diagram of an example of an incremental selective compiler tool 102 that is an element of a compilation system 108 and operates in a computer system 100. The compiler tool 102 enables reuse of parts of object code files 120 resulting from the compilation of one or more source code files 118. More particularly, the compiler tool 102 selectively updates an object code file 120 to reflect semantic changes in the source code file 118 since a prior compilation. Smartbuild 500 makes the decision to optimize the intermediate code stream 122 and generate a new object code file 120, or instead, to reuse the existing object code file 120.

It will be appreciated that a "build" refers to the process of compilation of input files, such as source code files 118 created by the user (such as "C" software code), that generate output files, such as object code files 120, that are used by another element of the compilation system 108. For a general discussion of existing compiler, linker, and optimization technologies, see "Principles of Compiler Design," by Alfred V. Aho and Jeffrey D. Ullman (Addison-Wesley, 1977), which is herein incorporated by reference in its entirety as background information.

Further, it will be understood that an intermediate code stream 122 may include instructions and data that have syntactic and semantic meaning, such as a postfix Polish string as discussed in Aho (pg. 518). Those skilled in the art will appreciate Polish string notation. Further, an object code file 120 is a computer file (such as a ".o" file) that may contain instructions and data in a form that a linker 112 may use to create an executable code file 124.

A code generator 113 creates object code files 120, and when the object code files 120 are combined the linker 112 may create executable code 124. It will be appreciated that the object code files 120 may optionally be combined with one or more library code files 114 that supply features of the computer system 100 that enable execution of the executable code 124. Examples of executable files 124 include those having an extension of "exe" operating under a Windows® operating system or an "a.out" file that may operate under a UNIX® operating system. Therefore, the present embodiment employs the linker 112 to resolve any undefined computer location references in the object code files 120 and to generate an executable code file 124 capable of executing on the computer system 100 with input/output (I/O) devices such as keyboard 148 and a mouse 152.

By means of an example, the form of an object code file 120 may be machine language, or relocatable machine-language as discussed in Aho, (pg. 518). Object code files 120 may be initially or temporarily located in the computer system 100, and may be relocated by the linker 112 for optimal execution in the computer system 100. For instance, an object code file 120 may contain references to symbolic locations defined within the object code file 120, references to symbolic locations defined in the computer system 100 but not in the object code file 120, and relocation information that allows the linker 112 to resolve the symbolic locations with actual references in the computer system 100.

The object code files 120 may be relocated in computer memory 106 thus allowing the object code files 120 to be compiled separately. Further, object code files 120 may be linked together by the linker 112 and loaded for execution by a loader 115. Separate compilation and linking enables flexible management of program execution, such as including previously compiled object code files 120 in another execution.

It will be appreciated that "execute" refers to the process of manipulating software or firmware instructions for operation on the computer system 100. The term "code" refers to instructions or data used by the computer system 100 for the purpose of generating instructions or data that execute in the computer system 100. Further, "object code file" 120 and "object file" 120 maybe used interchangeably herein. "Executable code file" 124 and "executable file" 124 may be used interchangeably herein. "Source code file" 118 and "source file" 118 may be used interchangeably herein. Also, the terms "procedure," and "function" will be used interchangeably herein. Further, the term "module" refers to a combination of procedures or functions that are treated as one unit by the computer system 100.

The present embodiment includes an optimizer 109 that generates object code 120 that includes optimization changes that may be dependent on a particular computer system 100. Further, these system-specific changes allow the optimizer 109 to generate object code 120 that is highly tailored to efficiently run on a specific computer system 100. For example, code may be tailored to support different cache organizations or a particular type of computer processors. Further, the optimizer 109 may take iterative changes to enhance further processing by the optimizer 109. In the present embodiment, the linker 112 may operate on the object code 120 generated by the optimizer 109.

The executable file 124 is created to operate on a particular computer system 100 and contains information used to load and execute a program. The term "program" refers to one or more procedures or files of code that are associated with each other for the purpose of executing as one unit on a computer system 100. As will be appreciated by those skilled in the art, information such as whether the executable file 124 is shared between other executable files 124 or uses libraries 114, may be included in the executable file 124. The executable file 124 may be executed by a loader 115, which operates to resolve any system-specific information such as address locations that are necessary to execute the executable file 124. For instance, the loader 115 may resolve address locations for libraries 114 used in the executable file 124 or may determine where to begin execution of the file 124. More particularly, the loader 115 works with an operating system (OS) 111 to determine the location in the memory 106 at which the executable file 124 may execute, and the loader 115 inserts the executable file 124 into the memory 106 at the appropriate location.

The compiler tool 102 includes instructions and data that may be referred to as values such as integer, real, or complex numbers or characters. Alternatively, the values may be pointers that reference values. Therefore, a pointer provides direction to locate a referenced value. A combination of characters may be referred to as a "string."

More particularly, the instructions may be operating instructions of the computer system 100 or addresses. The addresses may be actual computer addresses or virtual, symbolic addresses that represent actual computer addresses. For instance, an actual computer address may be a computer hardware register (not shown) or a location in the memory 106. It will be appreciate that the terms "virtual address" and "symbolic address" may be used interchangeably herein. The virtual address is a pointer to the actual address. The instructions and data are herein referred to as "instructions."

FIG. 1 further represents the computer system 100 that includes components such as the processor 104, the memory 106, a data storage device 140, and I/O adapter 142, a communications adapter 144, a communications network 146, a user interface adapter 150, the keyboard 148, the mouse 152, a display adapter 154, and a computer monitor 156. It will be understood by those skilled in the relevant art that there are many possible configurations of the components of the computer system 100 and that some components that may typically be included in the computer system 100 are not shown.

It will be understood by those skilled in the art that functions ascribed to the compiler tool 102, or any of its functional files, typically are performed by the central processing unit that is embodied in FIG. 1 as the processor 104 executing such software instructions.

The processor 104 typically operates in cooperation with other software programs such as the OS 111 and those included in the compilation system 108 including the compiler tool 102. Henceforth, the fact of such cooperation among the processor 104 and the compiler tool 102, whether implemented in software, hardware, firmware, or any combination thereof, may therefore not be repeated or further described, but will be implied. The OS 111 may cooperate with a file system 116 that manages the storage and access of files within the computer system 100. The interaction between the file system 116 and the OS 111 will be appreciated by those skilled in the art.

It will also be understood by those skilled in the relevant art that the functions ascribed to the compiler tool 102 and its functional files, whether implemented in software, hardware, firmware, or any combination thereof, may in some embodiments be included in the functions of the OS 111. That is, the OS 111 may include files from the compiler tool 102. In such embodiments, the functions ascribed to the compiler tool 102 typically are performed by the processor 104 executing such software instructions in cooperation with aspects of the OS 111 that incorporate the compiler tool 102. Therefore, in such embodiments, cooperation by the compiler tool 102 with aspects of the OS 111 will not be stated, but will be understood to be implied.

Computer memory 106 may be any of a variety of known memory storage devices or future memory devices, including any commonly available random access memory (RAM), cache memory, magnetic medium such as a resident hard disk, or other memory storage devices. In one embodiment, the OS 111 and the compiler tool 102 may reside in the memory 106 during execution in the computer system 100.

Source code 118, intermediate code stream 122, object code 120, and an executable code 124 may all reside in the memory 106 when the compiler tool 102 is operating under the control of the OS 111. The compilation system 108 and the OS 111, may also reside in the memory 106 when the compiler tool 102 is operating under the control of the OS 111. It will be appreciated that the compilation system 108 may include the following elements that enable the generation of executable code 124 capable of executing on the computer system 100. The compilation system 108 may include the optimizer 109, the intermediate code generator 113 including the compiler tool 102, the linker 112, the loader 115, the libraries 114, and the source compiler 107.

The compiler tool 102 may be implemented in the "C" programming language, although it will be understood by those skilled in the relevant art that other programming languages could be used. Also, the compiler tool 102 may be implemented in any combination of software, hardware, or firmware.

The data storage device 140 may be any of a variety of known or future devices, including a compact disk drive, a tape drive, a removable hard drive, or a diskette drive. Any such program storage device may communicate with the I/O adapter 142, that in turn communicates with other components in the computer system 100, to retrieve and store data used by the computer system 100. As will be appreciated, such program storage devices typically include a computer usable storage medium having stored therein a computer software program and data.

Input devices could include any of a variety of known I/O devices for accepting information from a user, whether a human or a machine, whether local or remote. Such devices include, for example, the keyboard 148, the mouse 152, a touchscreen display, a touch pad, a microphone with a voice recognition device, a network card, or a modem. The input devices may communicate with a user interface I/O adapter 142 that in turn communicates with components in the computer system 100 to process I/O commands. Output devices could include any of a variety of known I/O devices for presenting information to a user, whether a human or a machine, whether local or remote. Such devices include, for example, the display 156, a printer, an audio speaker with a voice synthesis device, a network card, or a modem. Output devices such as the display monitor 156 may communicate with the components in the computer system 100 through the display adapter 154. Input/output devices could also include any of a variety of known data storage devices 140 including a compact disk drive, a removable hard disk drive, or a diskette drive.

By way of illustration, the executable code 124 may typically be loaded through an input device and may be stored on the data storage device 140. A copy of the executable code 124 or portions of the executable code 124, may alternatively be placed by the processor 104 into the memory 106 for faster execution on the computer system 100.

The computer system 100 may communicate with a network 146 through a communications adapter 144. The network 146 may be a local area network, a wide area network, or another known computer network or future computer network. It will be appreciated that the I/O device used by the compiler tool 102 may be connected to the network 146 through the communications adapter 146 and therefore may not be co-located with the computer system 100. It will be further appreciated that other portions of the computer system, such as the data storage device 140 and the monitor 156, may be connected to the network 146 through the communications adapter 144 and may not be co-located.

Figure 2:
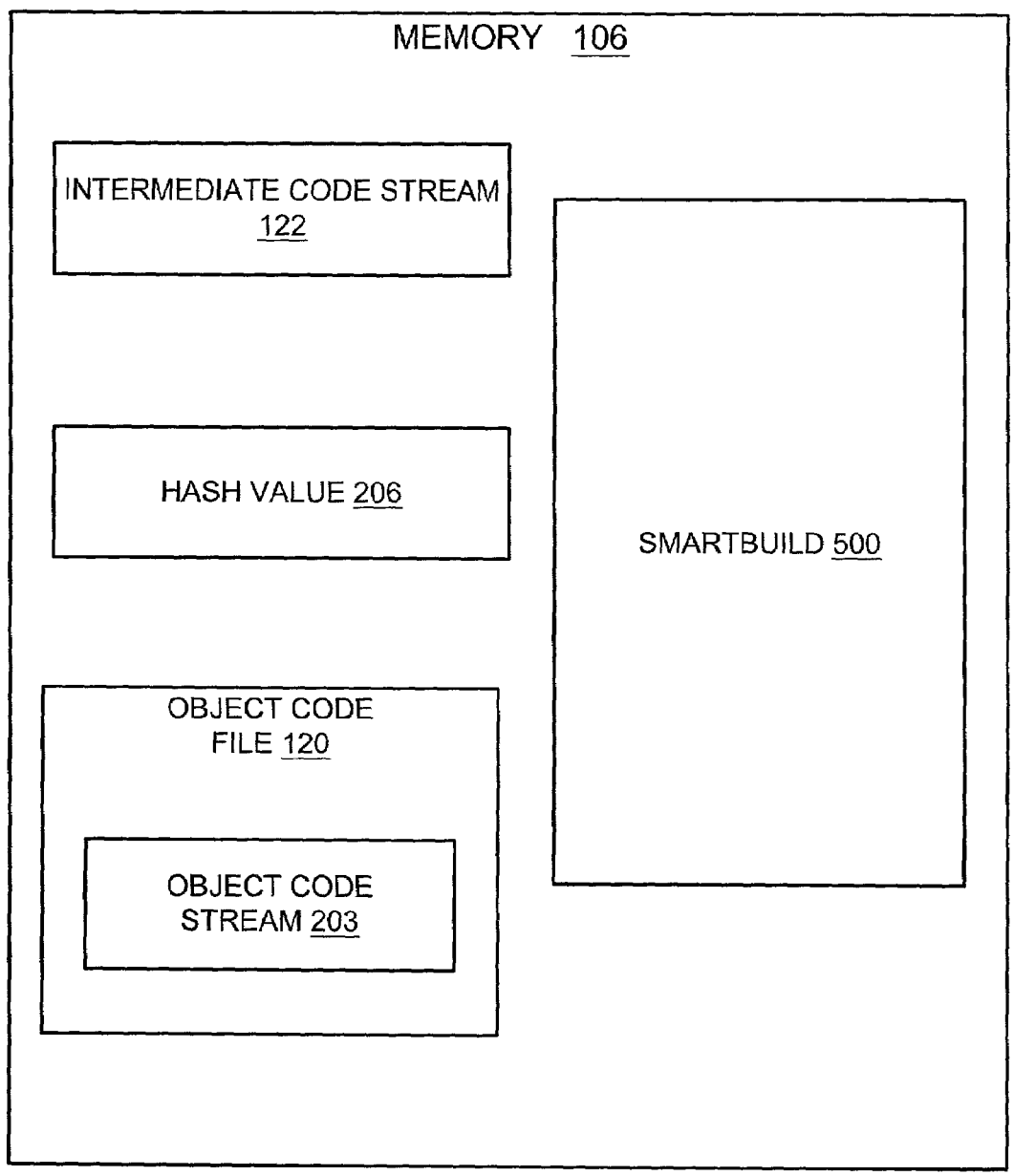
FIG. 2 is a block diagram of the memory of FIG. 1, including data structures used by the incremental compiler tool of the present invention.

Illustrated in FIG. 2 is a block diagram of an example of the memory 106 that includes data structures used by the incremental compiler tool 102 of the present invention. The data structures and functions are listed in the general order of discussion with references to the figures. The memory 106 may include many of the following. The intermediate code stream 122 is one or more instructions that represent compiler directives. An object code stream 203 is one or more instructions that represent compiler directives and that may be included in the object code file 120. Smartbuild 500 (FIG. 4) is the logic that creates the hash value 206 for the intermediate code stream 122. It is this hash value 206 that is used to determine if the intermediate code stream 122 has changed from the prior compilation represented in the object file 120.

Figure 3A:
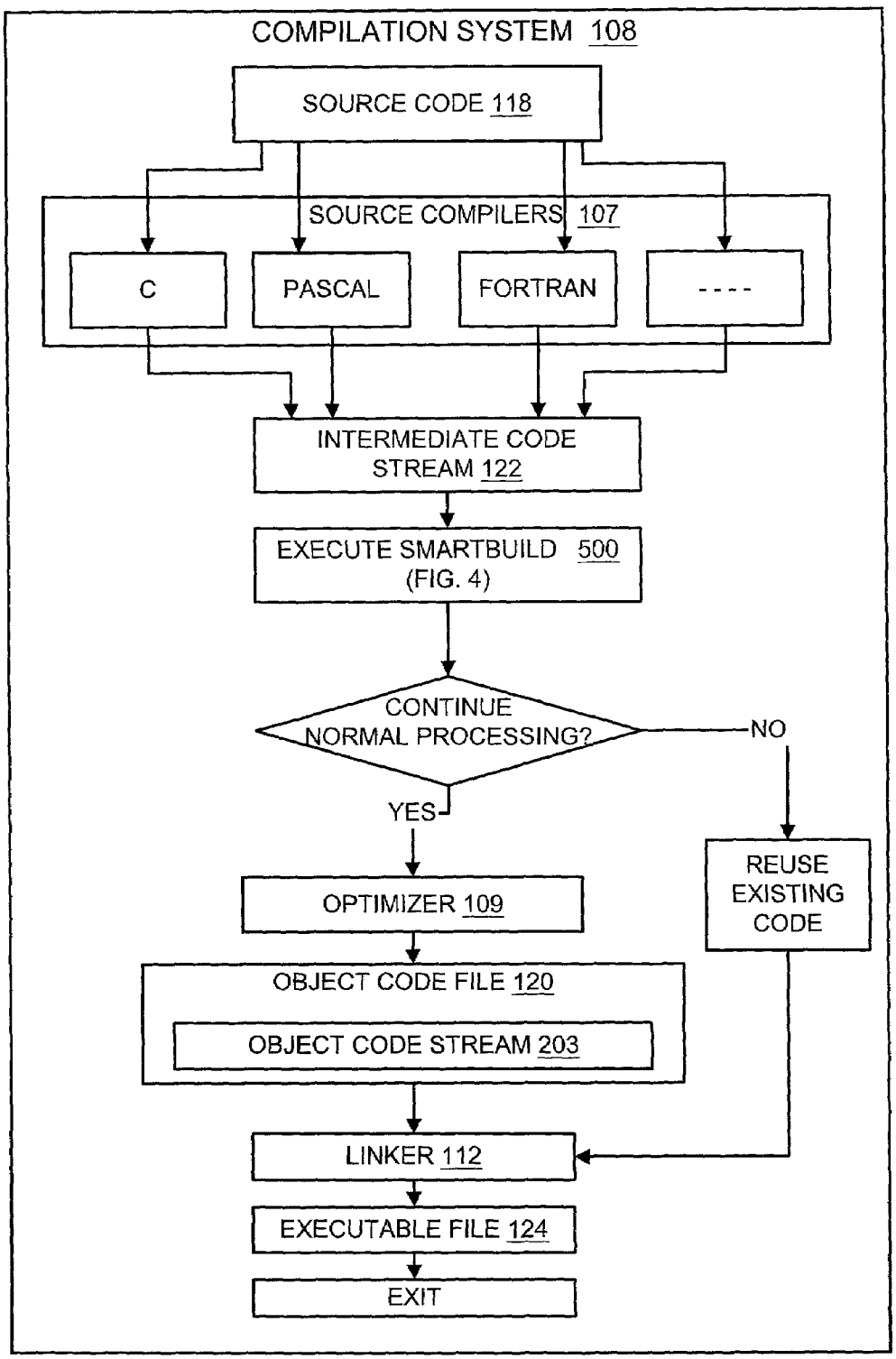
FIG. 3A is a flow diagram that illustrates an example of portions of the compilation system utilizing smartbuild of the present invention.

FIG. 3A is a flow diagram that illustrates an example of portions of the compilation system 108 utilizing the smartbuild optimizer of the present invention. As previously stated, the compilation system 108 utilizing smartbuild 500 (FIG. 4) provides suitable annotations in each object file scope to allow efficient identification of sections of code unchanged from prior compilations. Therefore, the compilation system 108 can re-utilize those code sections that have not changed from the previous compilation in a new version of a compiled system.

A user creates a source code 118 that may written in any of a variety of known specific programming languages, such as the "C," C++, Java, Pascal, or FORTRAN languages, or future languages. A source compiler 107 processes a source code file 118 and thereby transforms the source code file 118 into an intermediate code stream 122. The intermediate code stream 122 is then analyzed by smartbuild 500. The smartbuild process is herein defined in further detail with regard to FIG. 4.

After the intermediate code stream 122 is analyzed by smartbuild 500 the compilation system 108 determines whether it is to continue normal processing. If the compilation system 108 determines it is to continue normal processing, then the compilation system 108 performs the optimizer 109. However, if it is determined by the compilation system 108 that it is not to continue normal processing after the execution of smartbuild 500, then the compilation system 108 determines that it is to reuse the existing executable file 124 contents for the current scope, and then exits.

The optimizer 109 may optionally operate on the intermediate code stream 122 to enhance the resulting object code file 120 for the purpose of producing an executable file 124 that executes more efficiently. The object code file 120 may preserve the execution instructions included in the intermediate code stream 122 by including execution instructions in the object code stream 203. The linker 112 subsequently generates an executable file 124 by linking the associated object code files 120 and other files such as libraries 114 (as shown in FIG. 1).

Figure 3B:
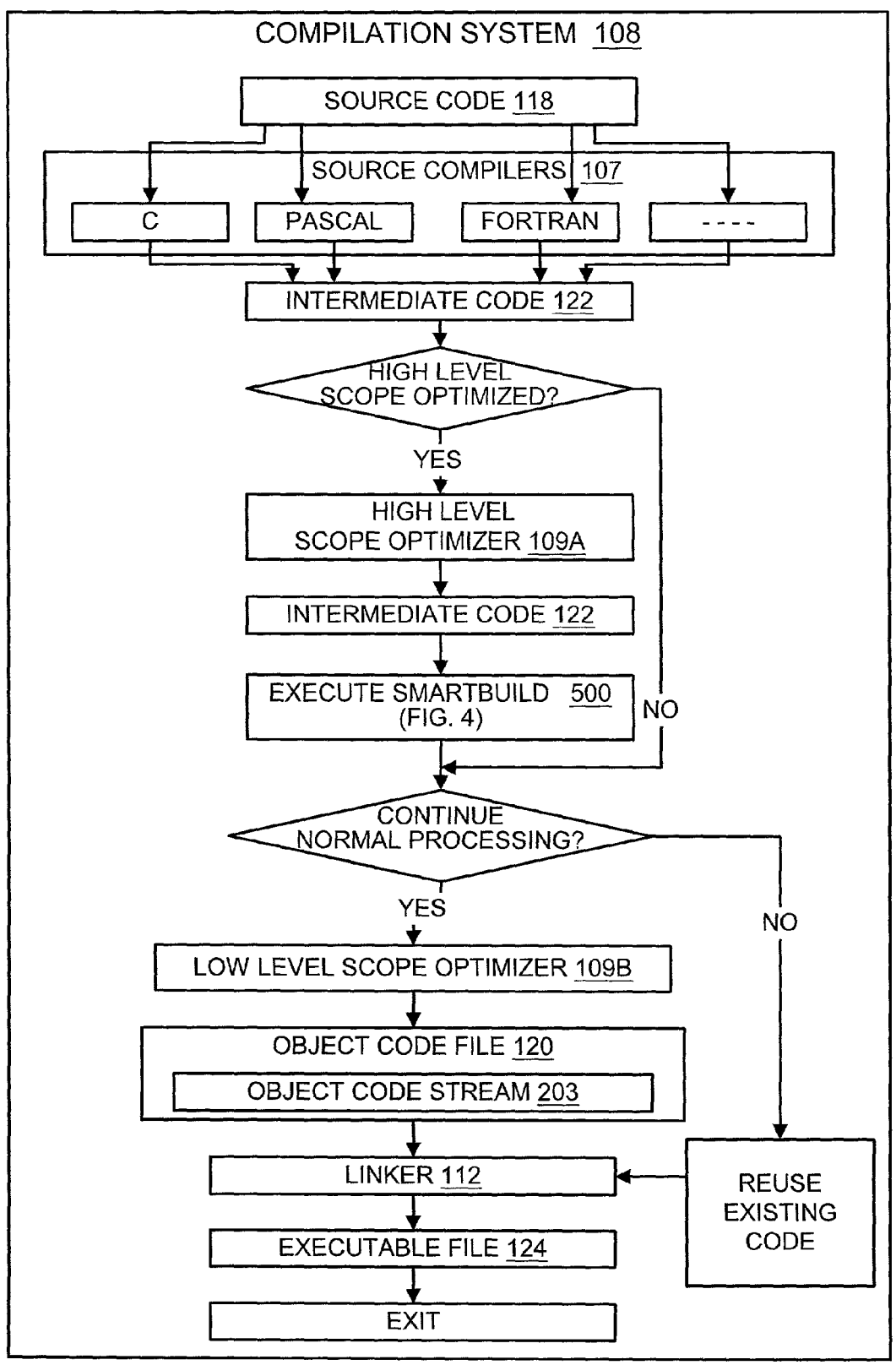
FIG. 3B is a flow diagram that illustrates an example of portions of the compilation system utilizing smartbuild of the present invention with a high and low level scope optimizer.

Illustrated in FIG. 3B is a flow diagram that depicts an example of portions of the compilation system 108 utilizing smartbuild 500 of the present invention with a high and low level scope optimizer 109. The compilation system 108 utilizing smartbuild 500 with the high and low level scope optimizers is a configuration that reuses the work of the downstream optimizer, but not the upstream optimizer. This is often used when the upstream optimizer 109A was of a wider scope than the downstream optimizer 109B. This is important because the optimization time cascades—more optimization time upstream means even more time optimization time downstream.

A user creates a source code 118 that may be written in any of a variety of known specific programming languages, such as the "C," C++, Java, Pascal, or FORTRAN languages, or future languages. A source compiler 107 processes a source code file 118 and thereby transforms the source code file 118 into an intermediate code stream 122. It is then determined that the high-level scope of the intermediate code stream 122 is to be optimized. If the high-level scope of the intermediate code is to be optimized, then the compiler system 108 performs the high-level scope optimizer 109A. This converts intermediate code to more efficient intermediate code. Next, the high-level optimized intermediate code stream 122 is then input into smartbuild 500. Smartbuild 500 is described in further detail with regard to FIG. 4.

However, if it is determined that the high-level scope of the intermediate code stream 122 is not to be optimized, then the compilation system 108 determines whether the compilation system 108 is to continue normal processing.

After the intermediate code stream 122 is analyzed by the smartbuild 500 the compilation system 108 determines whether it is to continue normal processing. If the compilation system 108 determines it is to continue normal processing, then the compilation system 108 performs the low-level optimizer 109B. However, if it is determined by the compilation system 108 that it is not to continue normal processing after the execution of the smartbuild 500, the compilation system 108 determines that it is to reuse the existing executable file 124, and exits.

The low-level optimizer 109B may optionally operate on the intermediate code stream 122 to enhance the resulting object code file 120 for the purpose of producing an executable file 124 that executes more efficiently. The object code file 120 may preserve the execution instructions included in the intermediate code stream 122 by including execution instructions in the object code stream 203. The linker 112 subsequently generates an executable file 124 by linking the associated object code files 120 and other files such as libraries 114 (as shown in FIG. 1).

Figure 4:
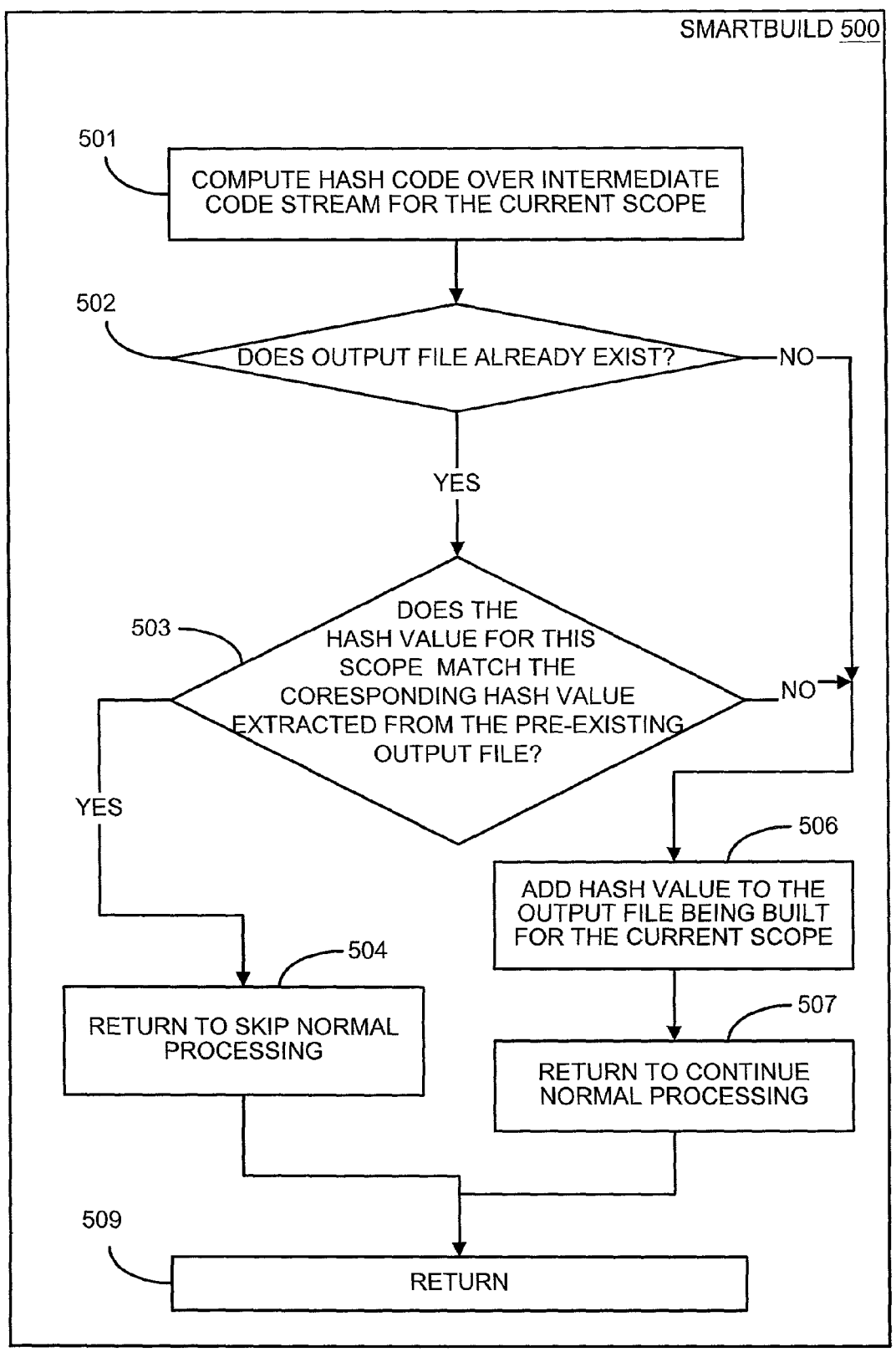
FIG. 4 is a flow diagram that illustrates an example of smartbuild, of the present invention, utilized with the incremental compilation tool.

Illustrated in FIG. 4 is a flow diagram that illustrates an example of the smartbuild 500 utilized with the incremental compilation tool 102 (FIG. 1). Smartbuild 500 determines whether the intermediate code stream 122 corresponding to the code for the scope in the object code file 120 was equal to the newly generated intermediate code stream 122. If smartbuild 500 determines that the newly generated intermediate code stream 122 is equal to the intermediate code stream 122 that was generated for the current scope in the object code file 120, then smartbuild 500 indicates this situation to the compiler system 108 to prevent wasting time in a recompilation of identical intermediate code stream 122.

Smartbuild 500 determines whether the newly generated intermediate code stream 122 is identical to the previous generated intermediate code stream 122 for a particular scope of code and data. This scope can be of varying sizes. The varying degrees of scope include, but are not limited to, individual instructions, basic blocks functions, subroutines, procedures, source-file, and whole-program optimization. These scopes are herein defined in further detail with regard to FIGS. 5A–5C.

Smartbuild 500 provides analysis of the intermediate code stream 122 to determine whether the intermediate code stream 122 has changed. First, smartbuild 500 computes a hash code 206 (FIG. 2) over the intermediate code stream 122 for the currently defined scope. As previously discussed, this scope can be of varying sizes and includes, but is not limited to, subroutine, function, or procedure scoping, source-file scoping and program scoping.

At step 502, smartbuild 500 then determines if the object code file 120 already contains a code and data stream 611 (FIG. 5B) for the intermediate code stream 122 of the current scope. If it is determined at step 502 that an code and data stream 611 for the current scope exists, then smartbuild 500 next determines whether the hash value 206 for the current scope matches the corresponding digital signature 612 (FIG. 5B) extracted from the preexisting object code file 120 at step 503. If it is determined at step 503 that the hash value 206 for the intermediate code stream 122 for the current scope matches the corresponding digital signature 612 (i.e. a hash value) extracted from the preexisting object code file 120, then smartbuild 500 proceeds to step 504 to skip normal processing and then exits at step 509. Smartbuild 500 skips the normal processing because it has determined that there were no changes to the intermediate code stream 122 for the current scope in the preexisting object code file 120. Because there were no changes, the preexisting object code file 120 is still valid.

However, if it is determined at step 502 that an object code file 120 does not already exist or if it is determined at step 503 that the hash value 206 for the current scope does not match the corresponding digital signature 612 extracted from the preexisting object code file 120, then smartbuild 500 assigns the current generated hash value 206 to the digital signature 612 in the object code file 120 being built for the current scope, at step 506. At step 507, the smartbuild 500 then returns to continue normal processing and exits at step 509.

Figure 5A:
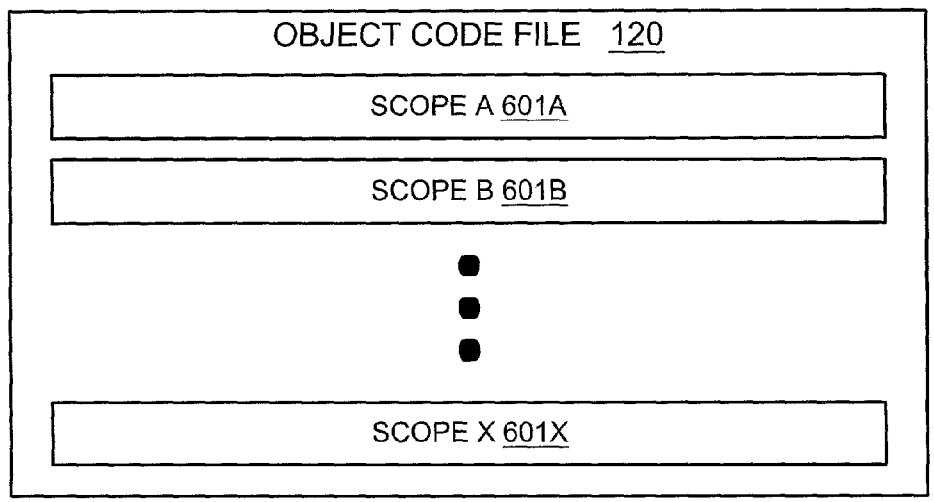
FIG. 5A is a block diagram illustrating an example of an object file containing one or more scopes, as shown in FIGS. 3A and 3B.
Figure 5B:
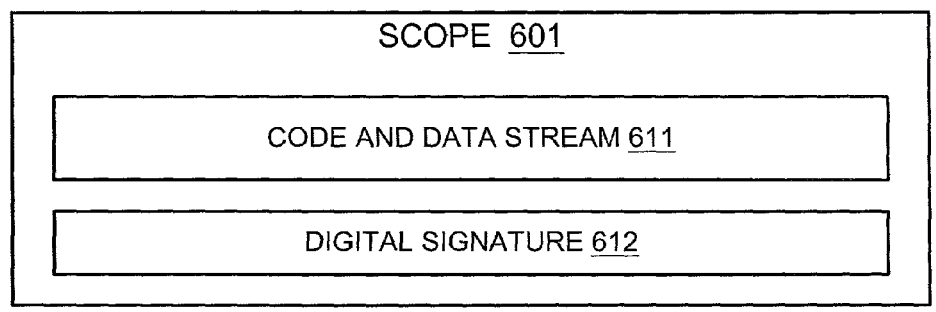
FIG. 5B is a block diagram that illustrates an example of a scope as shown in FIGS. 3A, 3B and 5A.
Figure 5C:
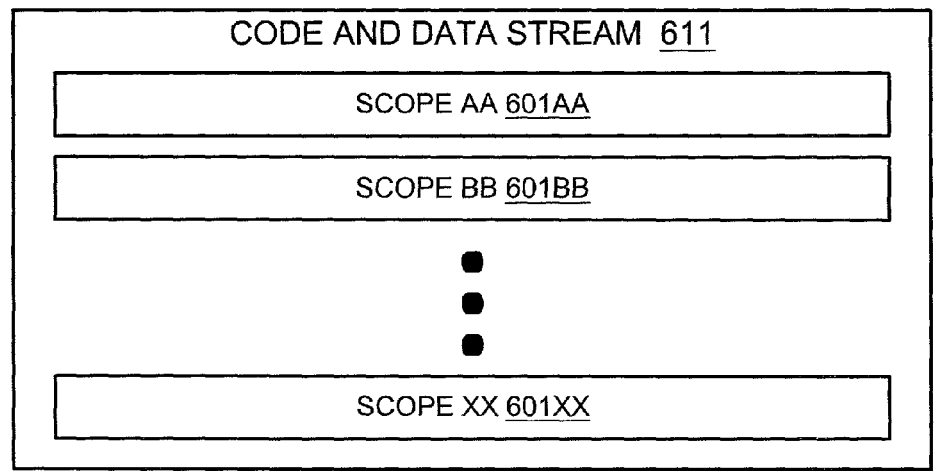
FIG. 5C is a flow diagram that illustrates an example of a code and data stream as illustrated in FIG. 5B.

Illustrated in FIGS. 5A–5C are block diagrams that illustrates examples of the scoping that are utilized by the smartbuild 500 of the present invention. Illustrated in FIG. 5A is an object file 120 that contains one or more scopes 601. These scopes may consist of both object code and data areas. In FIG. 5B, illustrated is an example of the model of the scope 601, as illustrated in FIG. 5A. The scope 601 contains the code and data stream 611 and the digital signature 612. Within the code and data stream 611 within the scope 601 there can exist additional scopes 601AA through 601XX. These scope definitions are recursive definitions utilizing the example scope definition as shown in FIG. 5B.

The smartbuild 500 computes a digital signature 611 (i.e. a hash value 206 (FIG. 2)) for the intermediate code stream 122, for the current scope defined. This digital signature 611 can be computed utilizing a variety of different known techniques, such as but not limited to, a secure hash algorithm (SHA), MD5, or any hashing or other means of representing the contents of the intermediate code stream 122.

An alternative embodiment relates to validating software maintenance changes. Software maintenance activities often require making changes that are intended to be very local in effect and then validating that the resulting change is truly as tightly focused as planned. Existing build systems such as "make" and similar file-timestamp-based systems cannot answer these questions since they have no knowledge of the semantics of the change. For instance, a comment added to a header file can ripple through every object file that references that header file—though there in fact has been no semantic change in the final code at all.

An alternative embodiment for this invention is a means of identifying change, more precisely than the variants of "make" immediately lead to a use in validating the scope of software maintenance changes. Only the intended files should recompile and no more. Any unexpected recompilation (reflected in the updated timestamps of the resulting object files) indicates an extreme probability that the scope of the source changes was not as limited as expected, and the exact list of source files to examine are easily determined from the corresponding object files that changed.

The foregoing description, for purposes of explanation, used specific nomenclature to provide a thorough understanding of the invention. However, it will be apparent to one skilled in the art that the specific details are not required in order to practice the invention. In other instances, known devices are shown in block diagram form in order to avoid unnecessary distraction from the underlying invention. Thus, the foregoing descriptions of specific embodiments of the compiler optimization tool are presented for the purposes of illustration and description. They are not intended to be exhaustive or to limit the invention to the precise forms disclosed, obviously many modifications and variations are possible in view of the above teachings. Those skilled in the art will recognize that changes may be made in form and detail without departing from the scope of the invention. The invention is limited only by the claims.

What is claimed is:

1. A method for optimizing compilation time of a program, the program including at least one block of code, said method comprising steps of:
   generating a current hash value for a block of intermediate code in the program wherein the prior hash value is associated with preexisting object code that corresponds to the block of intermediate code;
   generating a current object file from the block of intermediate code when the current hash value for the block of intermediate code does not correspond to the prior hash value;
   linking the generated current object file with other blocks of object code associated with the program;
   retrieving the preexisting object code when the current hash value for the block of intermediate code corresponds to the prior hash value; and linking the preexisting object code with other blocks of object code associated with the program.

2. The method of claim 1, further comprising:
setting a scope of the least one block of code.

3. The method of claim 1, further comprising the step of:
generating a notice when the hash value is not equal to a prior hash value for the block of code.

4. The method of claim 1, further comprising:
skipping optimization of the block of code if the current hash value equals a prior hash value; and
storing the current hash value in the block of code if the hash value is not equal to the prior hash value for the block of code.

5. The method of claim 4, wherein the storing a hash value step further comprises:
allocating area for the generated hash value.

6. The method of claim 4, wherein the generating a hash value step further comprises:
using a parameter in hashing function to generate the hash value, wherein the parameter is selected from at least one of the group of a code stream, and a data stream.

7. A system for optimizing compilation time of a program, the program including at least one block of code, comprising:
means for generating a hash value for a block of code in the program;
means for generating a current object file from the block of intermediate code when the current hash value for the block of intermediate code does not correspond to the prior hash value;
means for linking the generated current object file with other blocks of object code associated with the program;
means for retrieving the preexisting object code when the current hash value for the block of intermediate code corresponds to the prior hash value; and
means for linking the preexisting object code with other blocks of object code associated with the program.

8. The system of claim 7, further comprising:
means for setting a scope of the least one block of code.

9. The system of claim 7, further comprising:
means for generating a notice when the hash value is not equal to a prior hash value for the block of code.

10. The system of claim 6, further comprising:
means for storing the hash value with the block of code if the hash value is not equal to a prior hash value for the block of code; and
means for skipping optimization of the block of code if the hash value equals the prior hash value.

11. The system of claim 10, wherein the storing means further comprises:
means for allocating area for the generated hash value.

12. The system of claim 10, wherein the hash value is generated using a parameter in the block of code, wherein the parameter is selected from at least one of the group of a code stream, and a data stream.

13. A computer readable medium for optimizing compilation time of a program, the program including at least one block of code, comprising:
logic for generating a hash value for a block of code in the program;
logic for generating a current object file from the block of intermediate code when the current hash value for the block of intermediate code does not correspond to the prior hash value;
logic for linking the generated current object file with other blocks of object code associated with the program;
logic for retrieving the preexisting object code when the current hash value for the block of intermediate code corresponds to the prior hash value; and
logic for linking the preexisting object code with other blocks of object code associated with the program.

14. The computer readable medium of claim 13, further comprising:
logic for setting a scope of the least one block of code.

15. The computer readable medium of claim 13, further comprising:
logic for generating a notice when the hash value is not equal to a prior hash value for the block of code.

16. The computer readable medium of claim 13, further comprising:
logic for storing the hash value with the block of code if the hash value is not equal to a prior hash value for the block of code; and
logic for skipping optimization of the block of code if the hash value equals the prior hash value.

17. The computer readable medium of claim 16, wherein said logic for storing a hash value further comprises:
logic for allocating area for the generated hash value.

18. The computer readable medium of claim 16, wherein the hash value is generated using a parameter in the block of code, wherein the parameter is selected from at least one of the group of a code stream, and a data stream.

19. A system for optimizing compilation time of a program, comprising:
a compiler that generates at least one block of code from the program; and
a compilation optimizer, wherein the compilation optimizer further comprises:
logic that generates a hash value for a block of code in the program;
logic that generates a current object file from the block of intermediate code when the current hash value for the block of intermediate code does not correspond to the prior hash value;
logic that links the generated current object file with other blocks of object code associated with the program;
logic that retrieves the preexisting object code when the current hash value for the block of intermediate code corresponds to the prior hash value; and
logic that links the preexisting object code with other blocks of object code associated with the program.

20. The system of claim 19, wherein the compilation optimizer further comprises:
logic that sets a scope of the least one block of code.

21. The system of claim 19, wherein the compilation optimizer further comprises:
logic that generates a notice when the hash value is not equal to a prior hash value for the block of code.

22. The system of claim 19, further comprising:
logic that stores the hash value with the block of code if the hash value is not equal to a prior hash value for the block of code; and
logic that skips optimization of the block of code if the hash value equals the prior hash value.

23. The system of claim 22, wherein the compilation optimizer further comprises:
logic that allocates area for the generated hash value.

24. The system of claim 22, wherein the hash value is generated using a parameter in the block of code, wherein the parameter is selected from at least one of the group of a code stream, and a data stream.

25. A method for compiling a program, comprising:
    generating a current hash value for a block of intermediate code in the program;
    comparing the current hash value with a prior hash value associated with preexisting object code that corresponds to the block of intermediate code;
    linking the preexisting object code with other blocks of object code associated with the program when the current hash value corresponds to the prior hash value; and
    when the current hash value for the block of intermediate code does not correspond to the prior hash value,
        generating a current object file from the block of intermediate code when the current hash value for the block of intermediate code does not correspond to the prior hash value; and
        linking the generated current object file with other blocks of object code associated with the program.

26. The method of claim 25, further comprising changing a portion of the block of intermediate code in the program such that generating the current hash value and such that comparing the current hash value with the prior hash value validates software maintenance changes.

27. The method of claim 25, further comprising changing a portion of the block of intermediate code in the program such that generating the current hash value and such that comparing the current hash value with the prior hash value identifies changes in the program.

* * * * *

UNITED STATES PATENT AND TRADEMARK OFFICE
CERTIFICATE OF CORRECTION

PATENT NO. : 6,978,450 B2
APPLICATION NO. : 10/017572
DATED : December 20, 2005
INVENTOR(S) : Carl D. Burch It is certified that error appears in the above-identified patent and that said Letters Patent is hereby corrected as shown below:

Column 10, line 55, in Claim 1, after "generating" insert -- , using a computer processor, --.

Column 10, line 56, in Claim 1, delete "wherein the" and insert -- wherein a --, therefor.

Column 10, line 64, in Claim 1, delete "program;" and insert -- program if the current hash value for the block of intermediate code does not correspond to the prior hash value; --, therefor.

Column 11, line 2, in Claim 1, delete "program." and insert -- program if the current hash value for the block of intermediate code corresponds to the prior hash value. --, therefor.

Column 11, line 4, in Claim 2, after "the" insert -- at --.

Column 11, line 6, in Claim 3, after "the" insert -- current --.

Column 11, line 11, in Claim 4, after "if the" insert -- current --.

Column 11, line 19, in Claim 6, after "in" insert -- a --.

Column 11, line 26, in Claim 7, insert -- computer processor -- before "means".

Column 11, line 28, in Claim 7, delete "the" and insert -- a --, therefor.

Column 11, line 29, in Claim 7, delete "when the" and insert -- when a --, therefor.

Column 11, line 31, in Claim 7, delete "the" and insert -- a --, therefor.

Column 11, line 39, in Claim 7, delete "program." and insert -- program if the current hash value for the block of intermediate code corresponds to the prior hash value. --, therefor.

Column 11, line 41, in Claim 8, after "the" insert -- at --.

Column 11, line 45, in Claim 10, delete "claim 6" and insert -- claim 7 --, therefor.

Column 11, line 62, in Claim 13, after "logic" insert -- executed on a computer processor --.

Column 11, line 64, in Claim 13, delete "the" and insert -- a --, therefor.

Column 11, line 65, in Claim 13, delete "when the" and insert -- when a --, therefor.

Column 11, line 66, in Claim 13, delete "the" and insert -- a --, therefor.

CERTIFICATE OF CORRECTION (continued)
U.S. Pat. No. 6,978,450 B2

Column 12, line 8, in Claim 13, delete "program." and insert -- program if the current hash value for the block of intermediate code corresponds to the prior hash value. --, therefor.

Column 12, line 11, in Claim 14, after "the" insert -- at --.

Column 12, line 31, in Claim 19, insert -- the program including at least one block of code, -- before "comprising:".

Column 12, line 36, in Claim 19, delete "that generates" and insert -- executed on a computer processor for generating --, therefor.

Column 12, line 40, in Claim 19, delete "the" and insert -- a --, therefor.

Column 12, line 49, in Claim 19, delete "program." and insert -- program if the current hash value for the block of intermediate code corresponds to the prior hash value. --, therefor.

Column 12, line 52, in Claim 20, after "the" insert -- at --.

Column 13, line 4, in Claim 25, after "generating" insert -- , using a computer processor, --.

Signed and Sealed this

Ninth Day of February, 2010

David J. Kappos
*Director of the United States Patent and Trademark Office*